(12) United States Patent
de Ruijter et al.

(10) Patent No.: US 10,061,740 B2
(45) Date of Patent: Aug. 28, 2018

(54) RECEIVER WITH SIGNAL ARRIVAL DETECTION CAPABILITY

(71) Applicant: Silicon Laboratories Inc., Austin, TX (US)

(72) Inventors: Hendricus de Ruijter, Sunnyvale, CA (US); Wentao Li, Mountain House, CA (US)

(73) Assignee: SILICON LABORATORIES INC., Austin, TX (US)

( * ) Notice: Subject to any disclaimer, the term of this patent is extended or adjusted under 35 U.S.C. 154(b) by 887 days.

(21) Appl. No.: 14/080,405

(22) Filed: Nov. 14, 2013

(65) Prior Publication Data

US 2015/0131683 A1    May 14, 2015

(51) Int. Cl.
| | |
|---|---|
| H04B 7/02 | (2018.01) |
| H04L 1/02 | (2006.01) |
| G06F 13/42 | (2006.01) |
| H04L 27/22 | (2006.01) |
| H04W 56/00 | (2009.01) |
| H04J 3/16 | (2006.01) |

(52) U.S. Cl.
CPC .......... *G06F 13/4295* (2013.01); *H04L 27/22* (2013.01); *H04W 56/00* (2013.01); *H04J 3/1605* (2013.01)

(58) Field of Classification Search
CPC .... G06F 13/4295; H04L 27/22; H04W 56/00; H04J 3/1605
See application file for complete search history.

(56) References Cited

U.S. PATENT DOCUMENTS

| | | | | |
|---|---|---|---|---|
| 4,641,323 | A | * 2/1987 | Tsang | .................. H04L 27/2276 329/310 |
| 5,049,874 | A | * 9/1991 | Ishida | .................... G08B 5/223 340/4.5 |
| 5,504,454 | A | 4/1996 | Daggett et al. | |
| 6,111,927 | A | * 8/2000 | Sokoler | ................. H04J 3/0608 375/365 |
| 6,137,846 | A | 10/2000 | Kawai | |

(Continued)

OTHER PUBLICATIONS

G. D. Arndt and F. J. Loch, "A Study of FM Threshold Extension Techniques," National Aeronautics and Space Administration, Apr. 1972, 57 Pages, Technical Report, Report No. NASA TR R-384.

(Continued)

*Primary Examiner* — Wednel Cadeau
(74) *Attorney, Agent, or Firm* — Polansky & Associates, P.L.L.C.; Paul J. Polansky

(57) ABSTRACT

A receiver includes first, second, and third signal processors and a controller. The first signal processor provides a first signal in response to detecting a first attribute of a received signal. The second signal processor provides a second signal in response to detecting a second attribute of the received signal. The third signal processor provides a third signal in response to detecting a third attribute of the received signal and provides packet data. The controller enables the first signal processor in response to a receive enable signal, controls the third signal processor to provide the packet data in response to receiving the first signal and the third signal, and initializes the first signal processor and the third signal processor in response to receiving the first signal and the second signal.

17 Claims, 5 Drawing Sheets

(56) References Cited

U.S. PATENT DOCUMENTS

| | | | |
|---|---|---|---|
| 6,256,477 B1 * | 7/2001 | Eidson | H04B 1/1027 |
| | | | 455/296 |
| 7,003,063 B2 | 2/2006 | Mill | |
| 2002/0154620 A1 | 10/2002 | Azenkot et al. | |
| 2003/0043947 A1 | 3/2003 | Zehavi et al. | |
| 2004/0001532 A1 | 1/2004 | Mason et al. | |
| 2007/0274416 A1 | 11/2007 | Ishii | |
| 2011/0014910 A1 * | 1/2011 | Yonge, III | H04W 74/0808 |
| | | | 455/434 |
| 2013/0083648 A1 | 4/2013 | de Ruijter | |

OTHER PUBLICATIONS

Silicon Laboratories Inc., "High-Performance, Low-Current Transceiver," Data Sheet, Si4464/63/61/60, Rev. 1.2, 56 Pages, Dec. 2012.

Actions on the Merits for Copending U.S. Appl. No. 13/949,837, filed Jul. 24, 2013.

\* cited by examiner

RECEIVER WITH SIGNAL ARRIVAL DETECTION CAPABILITY

CROSS REFERENCE TO RELATED APPLICATION

Related subject matter is contained in copending application Ser. No. 13/949,837, filed Jul. 24, 2013, entitled "Receiver with Signal Arrival Detection Capability," invented by Hendricus de Ruijter and Wentao Li and assigned to the assignee hereof.

FIELD OF THE DISCLOSURE

The present disclosure relates generally to receivers, and more particularly to receivers for receiving and demodulating frame-based communications.

BACKGROUND

Wireless radio frequency (RF) receivers are used in a wide variety of applications such as smart metering, remote control, home security and alarm, telemetry, garage and gate openers, remote keyless entry, and the like. As used herein, a "radio frequency" signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. One common type of RF receiver is a frequency-shift keying (FSK) receiver that is compatible with the industrial, scientific and medical (ISM) radio bands in the 119 to 1050 megahertz (MHz) range. ISM radio bands are portions of the radio spectrum reserved internationally for the use of RF energy for industrial, scientific, and medical purposes other than communication.

Certain wireless communication standards define a preamble for a wireless packet, which is a predefined data pattern that a receiver can use to detect and settle its control loops. These control loops include the Automatic Gain Control (AGC), Automatic Frequency Compensation (AFC), and Bit Clock Recovery (BCR). After the receiver detects the end of the preamble, the receiver is prepared to receive a full packet including payload data. While many standards define a relatively long preamble pattern length (for example about 32 preamble bits in an alternating . . . 1010 . . . pattern) to provide enough time for these loops to settle, the N-mode of the wireless version of the Meter-Bus (M-Bus) standard, no. EN 13757-4, defines a relatively short preamble (about 16 bits in an alternating . . . 1010 . . . pattern). Although the shorter preamble provides an opportunity for the receiver to work faster and to take advantage of corresponding power savings, the shorter preamble also increases the burden on the receiver to reliably detect the signal arrival of the preamble and to settle its control loops in time.

Known receivers use a preamble detector to detect the arrival of a frame. In response to the preamble detector signaling the detection of the preamble, the receiver begins looking for the next portion of the frame. In the M-bus frame protocol, this next portion is a synchronization (SYNC) word. However under certain circumstances, the preamble detector can occasionally provide a false trigger, such as when a co-channel continuous wave (CW) tone is received at around sensitivity of the preamble detector, or when certain noise patterns are received. Known receivers solve this problem by using a timer to limit the amount of time the receiver searches for the SYNC word. If the timer expires before the SYNC word is detected, the receiver concludes that the preamble was erroneously detected and re-initializes itself to again start searching for a preamble. However a problem occurs when a real frame arrives after a false positive preamble detection but before the receiver has had a chance to re-initialize. In this situation, a real frame can be lost.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

A receiver as disclosed herein can be used for a variety of frame formats. The receiver A receiver includes first, second, and third signal processors and a controller. Each signal processor can be, for example, a dedicated hardware block, a portion of a software program running on a signal processor, or some combination of the two. The first signal processor provides a first signal in response to detecting a first attribute of a received signal. The first signal processor can detect the attribute either in the received signal directly or in a demodulated version thereof. The second signal processor provides a second signal in response to detecting a second attribute of the received signal. The third signal processor provides a third signal in response to detecting a third attribute of the received signal, such as a SYNC word, and provides packet data. The controller enables the first signal processor in response to a receive enable signal, controls the third signal processor to provide the packet data in response to receiving the first signal and the third signal, and initializes the first signal processor and the third signal processor in response to receiving the first signal and the second signal.

In one particular form of the receiver useful for the M-bus standard, the receiver includes a signal arrival detector, a jump detector, a frame processor, and a controller. The signal arrival detector provides an arrival signal in response to detecting a preamble in the received signal. The jump detector provides a jump signal in response to detecting a jump in signal strength of the received signal over a period of time above a threshold. The frame processor demodulates the received signal and provides a sync detected signal in response to detecting a synchronization word in the received signal and packet data. The controller is connected to the signal arrival detector, the jump detector, and the frame processor. The controller enables the signal arrival detector in response to a receive enable signal, controls the frame processor to search for the synchronization word in response to the arrival signal, and controls the frame processor to receive a frame in response to detecting the synchronization word. The controller further terminates searching for the synchronization word and re-enables the signal arrival detector in response to the jump signal.

Figure 1:
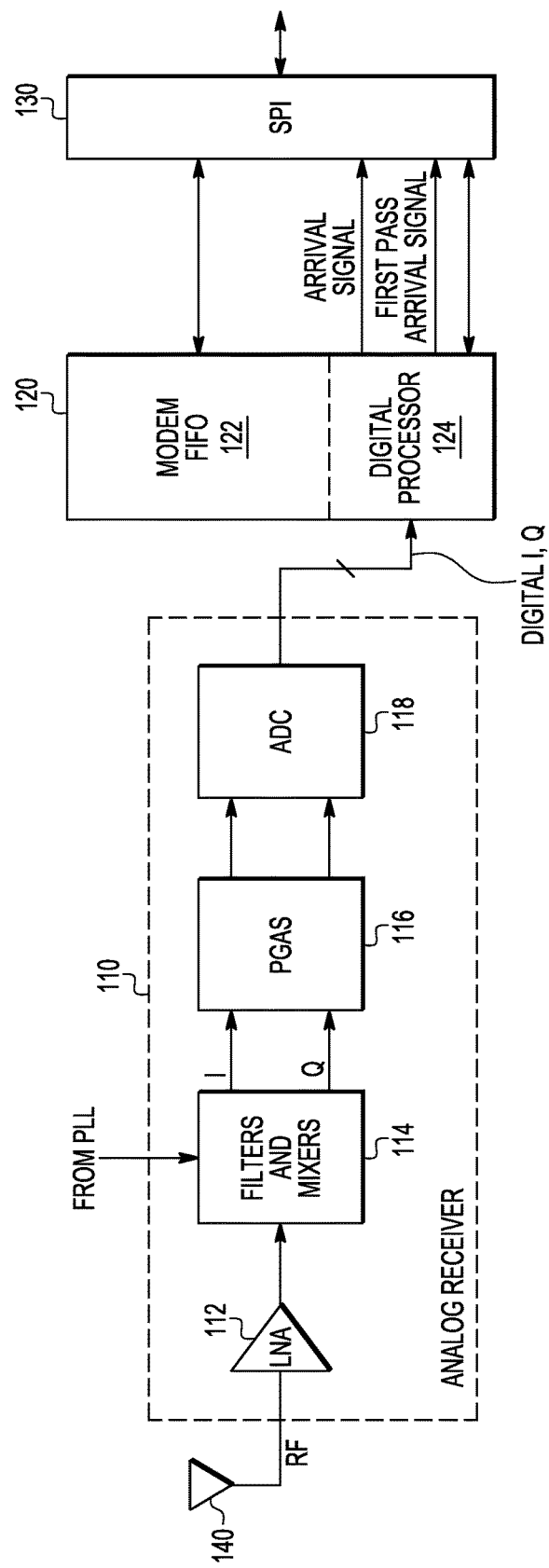
FIG. 1 illustrates in partial block diagram and partial schematic form a receiver according to one embodiment.

FIG. 1 illustrates in partial block diagram and partial schematic form a receiver 100 according to one embodiment. For the example shown in FIG. 1, receiver 100 generally includes an analog receiver 110, a digital channel circuit 120, a serial peripheral interface (SPI) controller 130 labeled "SPI", and an antenna 140.

Analog receiver 110 includes a low noise amplifier 112 labeled "LNA", a multiple number of filters and mixers 114, a multiple number of programmable gain amplifiers 116 labeled "PGAs", and an analog-to-digital converter 118 labeled "ADC". LNA 112 has an input for receiving a radio frequency broadcast signal labeled "RF" and an output. Multiple filters and mixers 114 has a first input connected to the output of LNA 112, a second input connected to an output of a phase locked loop (not shown) for receiving a local oscillator signal, and a first output for providing an in-phase intermediate frequency (IF) output labeled "I", and a second output for proving a quadrature IF output labeled "Q". Each of PGAs 116 has a first input connected to the first output of multiple filters and mixers 114 for receiving the I signal, and a second input connected to the second output of multiple filters and mixers 114 for receiving the Q signal, a first output, and a second output. ADC 118 has a first input connected to the first output of multiple PGAs 116, a second input connected to the second output of multiple PGAs 116, and an output for providing a set of signals labeled "DIGITAL I, Q".

Digital channel circuit 120 includes a modulator-demodulator first-in, first-out buffer 122 labeled "MODEM FIFO", and a digital processor 124. MODEM FIFO 122 is connected to SPI controller 130. Digital processor 124 has an input connected to the output of ADC 118 for receiving the DIGITAL I, Q signals, a first output for providing a signal labeled "ARRIVAL SIGNAL", and a second output for providing a signal labeled "FIRST PASS ARRIVAL SIGNAL".

SPI controller 130 is connected to MODEM FIFO 122, has a first input connected to the output of digital processor 124 for receiving the ARRIVAL SIGNAL, a second input connected to the output of digital processor 124 for receiving the FIRST PASS ARRIVAL SIGNAL, is connected to digital processor 124, and is adapted to connect to a set of SPI peripherals (not shown).

Antenna 140 delivers the RF signal to the input of LNA 112.

Some known receivers detect the arrival of a signal by comparing the demodulated data stream with an expected bit sequence. The receiver uses this technique to detect a preamble pattern. However, by relying on the demodulated data, the receiver may be susceptible to missing the preamble and a following data packet. This problem increases in difficulty when the receiver attempts to detect a shorter preamble. Also, some known receivers may use pattern recognition techniques to detect preambles. Although pattern recognition techniques may provide a more reliable way to detect the preamble, pattern recognition circuits generally consume precious circuit area and power of the receiver.

A receiver, as described herein, achieves fast frequency convergence and conserves power, while reliably detecting short preambles in a relatively short time period. The receiver includes a signal arrival detector that reacts well to frequency offset, thus AFC can be postponed until after the signal arrival detector detects the preamble signal.

In operation, LNA 112 receives the RF signal from antenna 140 and provides an amplified internal signal to filters and mixers 114. In one embodiment, the RF signal supports an M-Bus compatible short preamble. A PLL (not shown) within receiver 100 provides a local oscillator signal to filters and mixers 114. Receiver 100 uses the local oscillator signal to support configurable data rates, for example, from 100 bits per second (bps) to 1 million bps. Filters and mixers 114 convert the amplified internal signal into in-phase (I) and quadrature (Q) components at a low IF and then filter the I and Q signals in corresponding low pass filters that reject frequencies above the selected IF. The signal levels are adjusted in PGAs 116, using well-known AGC techniques. ADC 118 converts the outputs of PGAs 116 to the DIGITAL I, Q signals. MODEM FIFO 122 exchanges data through SPI controller 130 with, for example, a microcontroller unit (MCU), not shown, and collects receive data from the FIFO buffer, applies transmit data to the FIFO buffer, and configures the radio. MODEM FIFO 122 is a 128 kilobyte (kB) FIFO that supports different configurations. In one configuration, MODEM FIFO 122 operates as a 64 kB transmit FIFO and a 64 kB receive FIFO. In another configuration, MODEM FIFO 122 operates as a 128 kB receive FIFO. In yet another configuration, MODEM FIFO 122 includes a 128 kB transmit FIFO. Digital processor 124 processes the DIGITAL I, Q signals in the digital domain to form the ARRIVAL SIGNAL, after detecting a desired signal, for example, a short preamble. In one embodiment, receiver 100 is a FSK compatible receiver.

Figure 2:
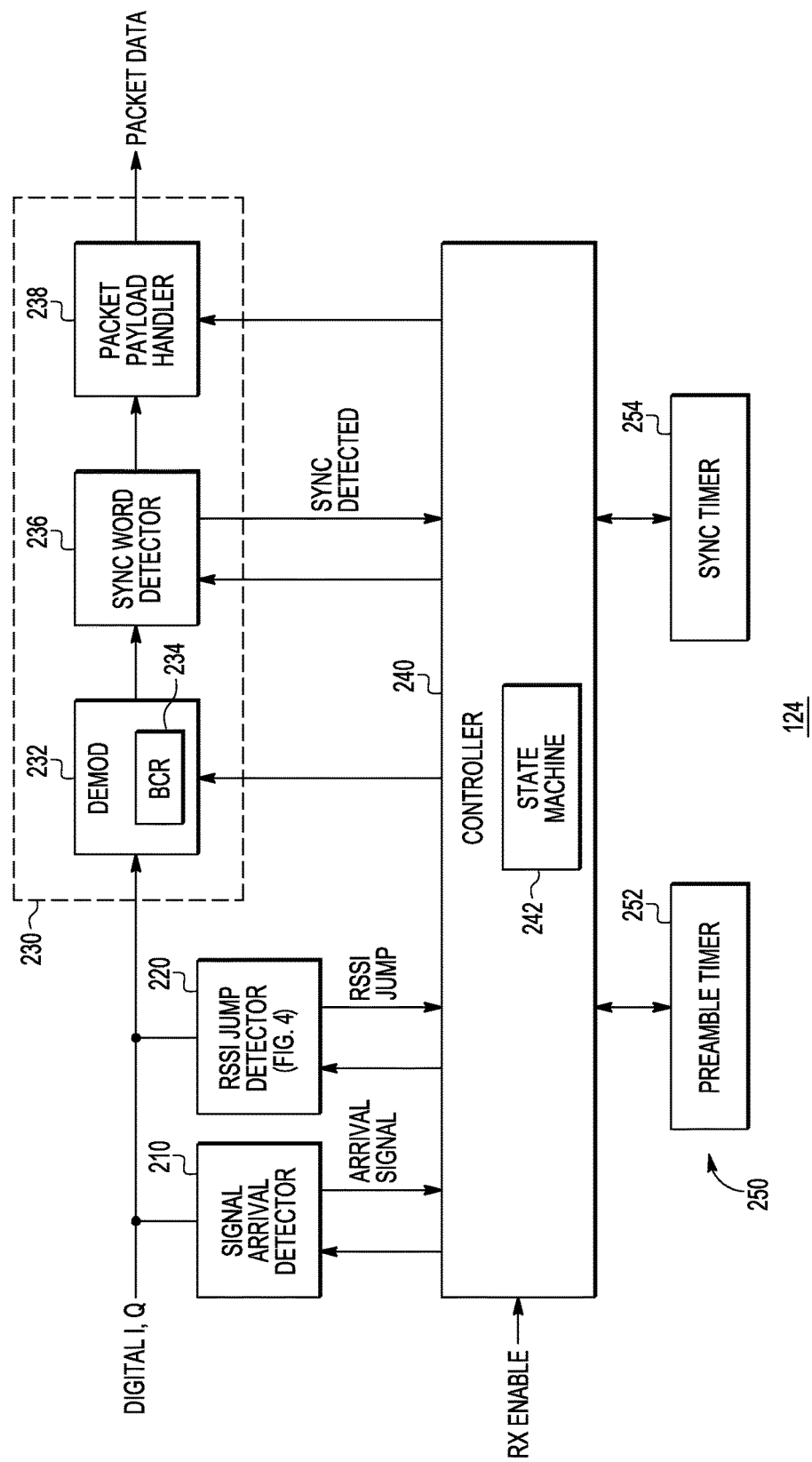
FIG. 2 illustrates in block diagram form a portion of the digital processor of FIG. 1 useful for detection of false signal arrivals.

FIG. 2 illustrates in block diagram form a portion of digital processor 124 of FIG. 1 useful for detection of false signal arrivals. As shown in FIG. 2, digital processor 124 includes a signal arrival detector 210, a received signal strength indicator (RSSI) jump detector 220, a frame processor 230, a controller 240, and a set of timers 250.

Signal arrival detector 210 has an input for receiving the DIGITAL I, Q signal from ADC 118, a control input, and an output for providing a signal labeled "ARRIVAL SIGNAL". RSSI jump detector 220 has an input for receiving the DIGITAL I, Q signal from ADC 118, a control input, and an output for providing a signal labeled "RSSI JUMP".

Frame processor 230 includes a demodulator 232, a synchronization (SYNC) word detector 236, and a packet payload handler 238. Demodulator 232 has an input for receiving the DIGITAL I, Q signal from ADC 118, a control input, and an output, and has a bit clock recovery (BCR) block which will be described further below. Sync word detector 236 has an input connected to the output of demodulator 232, a control input, a first output, and a second output for providing a signal labeled "SYNC DETECTED". Packet payload handler 238 has an input connected to the first output of sync word detector 236, a control input, and an output for providing a signal labeled "PACKET DATA".

Controller 240 has an input for receiving a signal labeled "RX ENABLE", inputs respectively connected to the outputs of signal arrival detector 210, RSSI jump detector 220, SYNC word detector 236, and first and second bidirectional ports for conducting two sets of timer signals. Controller 240 includes a state machine 242 for controlling the operation of the various blocks in digital processor 124.

Set of timers 250 includes a preamble timer 252 and a SYNC timer 254. Preamble timer 252 and SYNC timer 254 have bidirectional ports respectively connected to the first and second bidirectional ports of controller 240.

Note that FIG. 2 illustrates various signal processing elements by their respective functions. In a real implementation of digital processor 124, various elements can share common elements. For example, both signal arrival detector 210 and demodulator 232 can share a common coordinate rotation digital computer, known as a "CORDIC", or a common phase computer.

In general, state machine 242 in controller 240 starts in response to the RX ENABLE signal, and controller 240 enables signal arrival detector 210 and RSSI jump detector 220. Signal arrival detector 210 detects the arrival of a frame and activates the ARRIVAL SIGNAL in response. Controller 240 then enables demodulator 232 and SYNC word detector 246 in frame processor 230. Demodulator 232 starts bit clock recovery block 234 and provides demodulated symbols to SYNC word detector 236. SYNC word detector 236 parses the sequence of received symbols to detect the timing of the SYNC word and provides the SYNC DETECTED signal in response. Controller 240 then enables packet payload handler 238 to receive and strip the packet data from the rest of the received frame and deliver the packet data either to modem FIFO 122 or directly to SPI interface 130 based on the selected mode as described above, or to an output pin such as a general purpose input/output (GPIO) pin configured as an output.

In the illustrated embodiment, signal arrival detector 210 detects the arrival of a frame quickly by detecting attributes of the received signal instead of detecting the preamble directly in the received signal. In this way, it reliably detects short preambles used in standards such as M-bus in a relatively short time period. For example in one possible embodiment, signal arrival detector 210 examines the DIGITAL I, Q signal for the presence of large phase jumps or "clicks" that are characteristic of additive white Gaussian noise but not of a received FSK frame with sufficient signal strength. Signal arrival detector 210 signals the arrival of a frame by activating the ARRIVAL SIGNAL in response to detecting the absence of such phase clicks over a statistically significant period of time. A signal arrival detector suitable for this operation is described in copending application Ser. No. 13/949,847, which is herein incorporated by reference in its entirety, but in other embodiments other signal arrival detectors may be used such as those using pattern recognition and preamble correlation circuitry.

However signal arrival detector 210 will occasionally signal a false positive ARRIVAL SIGNAL, such as when a co-channel CW tone is received at around sensitivity the Signal Arrival Detector, or when certain noise patterns are received. Most of the time, the false positive ARRIVAL SIGNAL will be harmless. In response to the activation of the ARRIVAL SIGNAL, controller 240 enables demodulator 232 and SYNC word detector 236 and starts preamble timer 252 and SYNC timer 254. In a typical scenario, these timers will timeout without the detection of the preamble or SYNC portions of the frame, respectively, causing controller 240 to recognize the activation of the ARRIVAL SIGNAL was a false positive and to return to a state in which it searches for the arrival of another frame.

In a certain rare scenario, signal arrival detector 210 will detect a false positive shortly before a real frame arrives. In this case, controller 240 will be waiting for SYNC timer 254 to expire when the real frame arrives, causing digital processor 124 to miss the actual signal arrival of the real frame. In this rare scenario, controller 240 will not start searching for the preamble of a real frame again in time to detect the real preamble, which is more likely in the case of short preambles.

Figure 3:
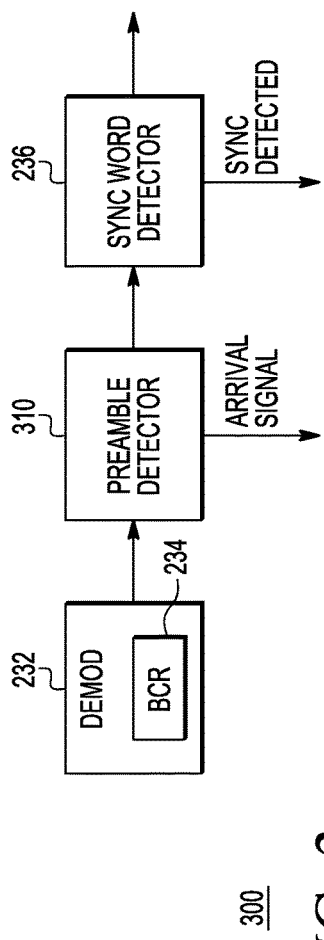
FIG. 3 illustrates in block diagram form a portion of the digital processor of FIG. 1 according to another embodiment.

To solve this problem, digital processor 124 uses RSSI jump detector 220 to detect the potential missing frame situation by measuring a sudden jump in receive signal strength before it times out waiting on the SYNC word. The sudden jump in received signal strength is another indicator of the arrival of the preamble and can indicate that another signal has arrived that is stronger than the undesirable CW or noise. Thus digital processor 124 virtually eliminates missing frames while preserving early detection of short preambles. Further details of digital processor 124 will now be described FIG. 3 illustrates in block diagram form a portion 300 of digital processor 124 of FIG. 1 according to another embodiment. Portion 300 includes demodulator 232 and SYNC detector 236 as described above, but also includes a preamble detector 310 connected between demodulator 232 and SYNC word detector 236 in place of signal arrival detector 210. Preamble detector 310 has an input connected to the output of demodulator 232, a first output connected to SYNC word detector 236, and a second output for providing the ARRIVAL SIGNAL to controller 240 in response to detecting the preamble of a frame. In order for preamble detector 310 to detect a preamble, demodulator 232 is continuously active to decode symbols in the DIGITAL I, Q signal.

Figure 4:
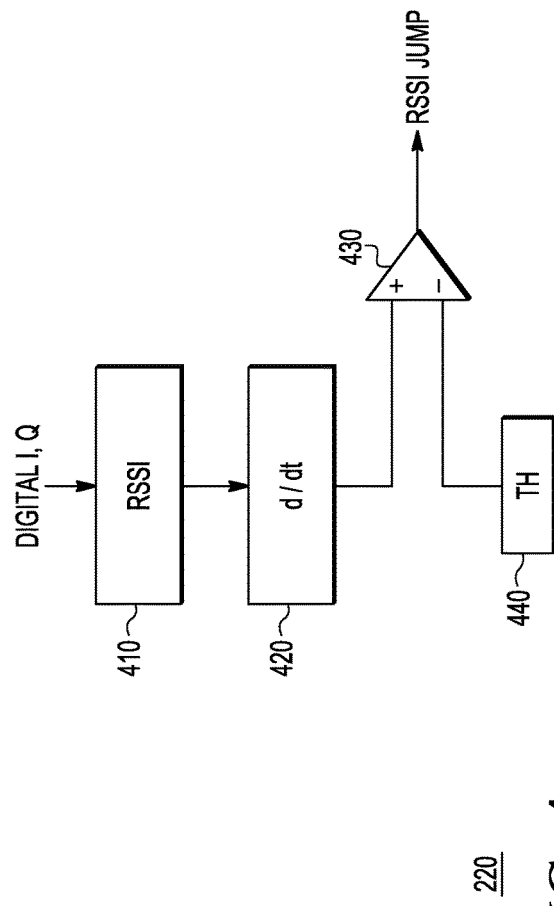
FIG. 4 illustrates in block diagram form the RSSI jump detector of FIG. 2.

FIG. 4 illustrates in block diagram form the RSSI jump detector 220 of FIG. 2. RSSI jump detector 220 includes an RSSI 410, a differentiator 420 labeled "d/dt", a comparator 430, and a threshold register 440 labeled "TH". RSSI 410 has an input for receiving the DIGITAL I, Q signal, and an output. Differentiator 420 has an input connected to the output of RSSI 410, and an output. Comparator 430 has a positive input connected to the output of differentiator 420, a negative input, and an output for providing a signal labeled "RSSI JUMP". Register 440 has an output connected to the negative input of comparator 430.

RSSI 410 determines the instantaneous signal strength of the DIGITAL I, Q signal received from ADC 118 of FIG. 1. Differentiator 420 determines the rate of change of the received signal strength with respect to time. Comparator 430 then compares this value to a threshold stored in register 440, and provides the RSSI JUMP signal in response to the rate of change exceeding the threshold. In this way, RSSI jump detector 220 detects a sudden increase in signal level that is also characteristic of the arrival of a signal.

Figure 5:
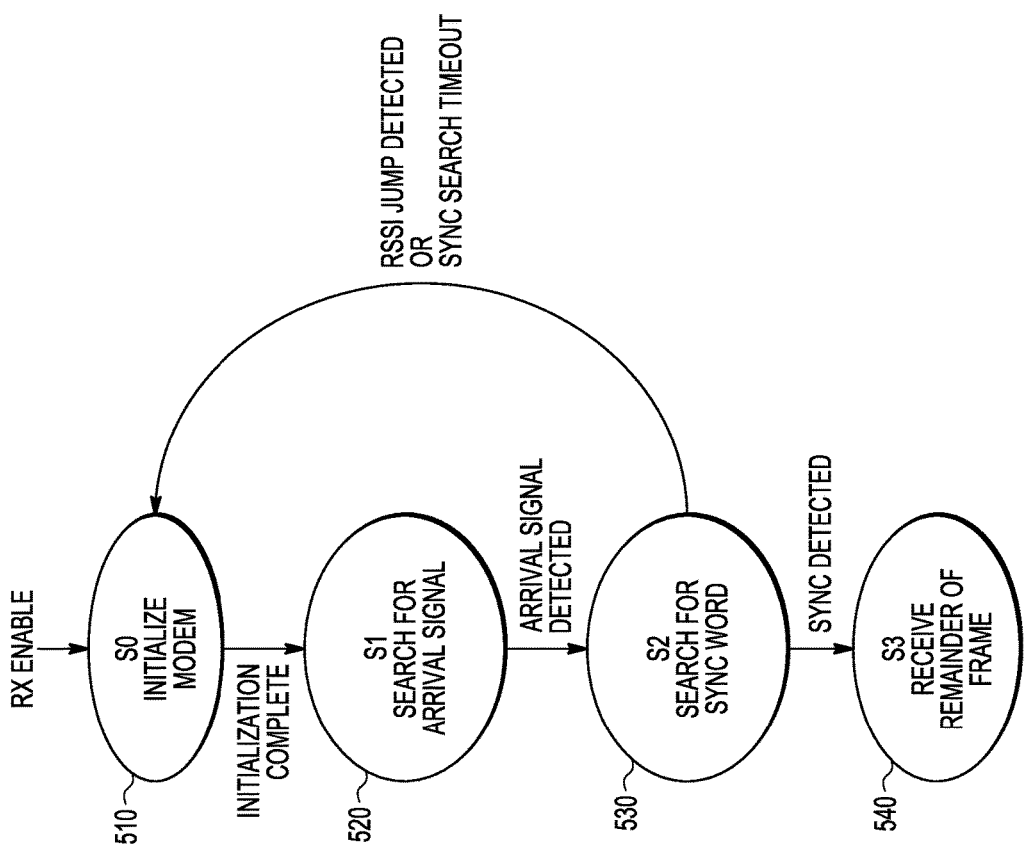
FIG. 5 illustrates a state diagram showing the operation of the state machine of FIG. 2.

FIG. 5 illustrates a state diagram 500 showing the operation of state machine 242 of FIG. 2. State machine 242 includes four states 510, 520, 530, and 540 labeled "S0", "S1", "S2", and "S3", respectively. In response to the activation of the RX ENABLE signal, state machine 242 enters state S0. In state S0, the modem is initialized. When the initialization is complete, state machine 242 automatically transitions to state S1. In state S1, controller 240 controls digital processor 124 to search for the arrival of a frame. For example, a separate signal arrival detector 210 can detect the characteristics of the DIGITAL I, Q signal in order to provide an early arrival signal. Alternatively a preamble detector 310 can detect an in-frame preamble.

When the arrival of a frame is detected, the flow transitions to state S2. In state S2, controller 240 controls digital processor 124 to search for the SYNC word.

There are two transitions out of state S2. First, if digital processor 124 detects the SYNC word, the flow transitions to state S3 in which digital processor 124 receives and demodulates the remainder of the frame. Second, if controller 240 either detects the RSSI JUMP signal or fails to detect the SYNC word within a certain time period, state machine 242 returns to state S0. Thus digital processor 124 uses the RSSI JUMP signal to detect a false positive ARRIVAL SIGNAL.

Figure 6:
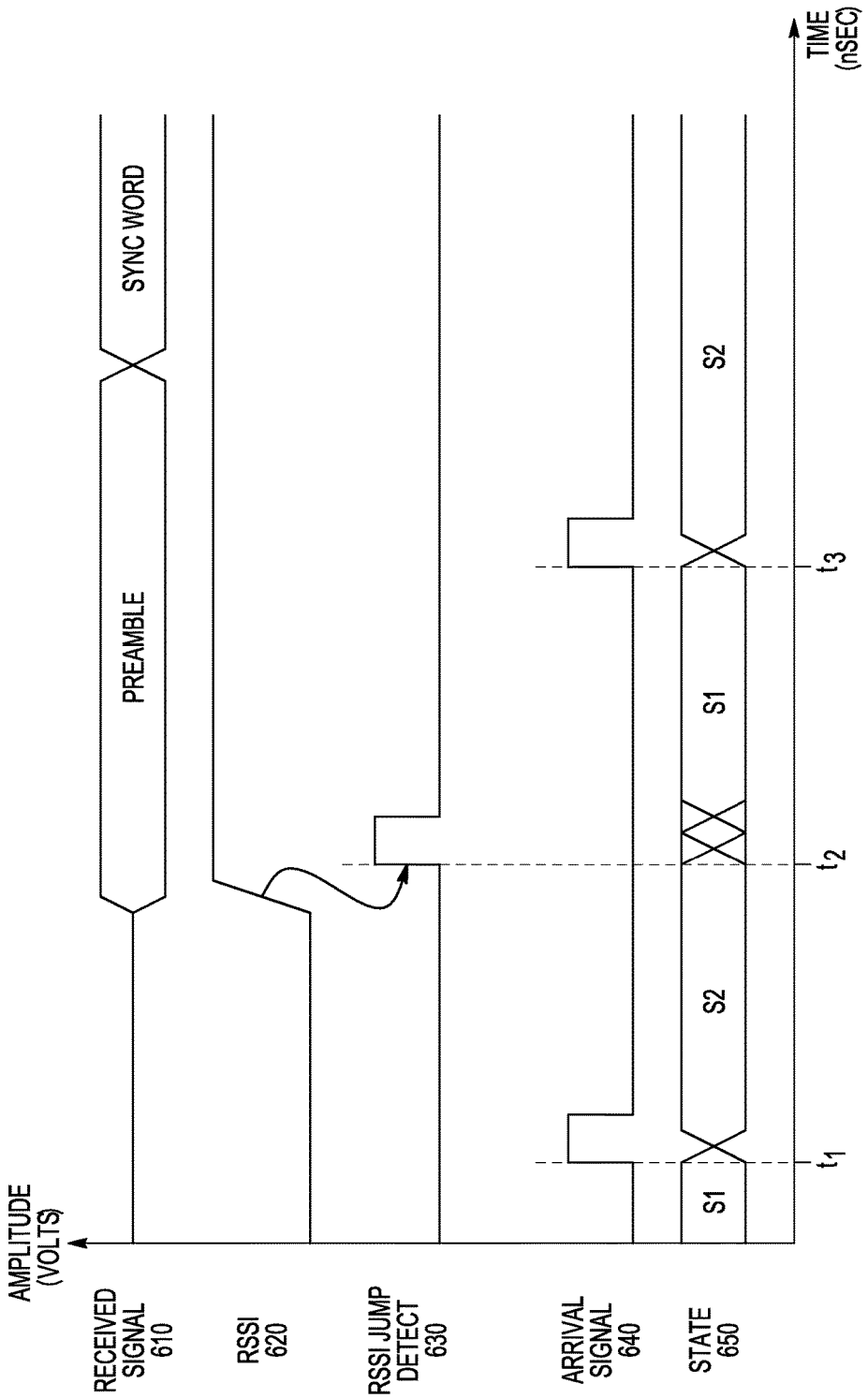
FIG. 6 illustrates a timing diagram useful in understanding the operation of the state machine of FIG. 5.

FIG. 6 illustrates a timing diagram useful in understanding the operation of the state machine 242 of FIG. 2. In FIG. 6, the horizontal axis represents time in nanoseconds (nsec), and the vertical axis represents the amplitude of various signals in volts. FIG. 6 shows waveforms of several signals of interest, including a waveform 610 representing the received signal, a waveform 620 of the RSSI signal at the output of RSSI 410, a waveform 630 of the RSSI JUMP signal, a waveforms 640 of the ARRIVAL SIGNAL, and a waveform 650 indicating the state of state machine 242. Note that waveforms 610 and 650 are illustrative waveforms to show states that may not correspond to actual signal voltages.

In the example shown in FIG. 6, controller 240 has been initialized and is initially in state S1. At around a first time labeled "$t_1$", signal arrival detector 210 activates the ARRIVAL SIGNAL. State machine 242 transitions to state S2 in response to the activation of the ARRIVAL SIGNAL. In the example shown in FIG. 6, digital processor 124 detects a false positive ARRIVAL SIGNAL around time $t_1$, and thus the RECEIVED SIGNAL does not correspond to any frame. Before the SYNC timer times out, however, the preamble of a real frame arrives shortly before a time labeled "$t_2$". RSSI jump detector 220 detects a sudden jump in signal strength above the threshold when it subsequently receives the preamble of the real frame, and activates the RSSI JUMP signal at time t2. In response, state machine 242 transitions back to state S1 (after transitioning temporarily through state S0). The transition back to state S1 allows digital processor 124 to be able to correctly detect the arrival of the preamble of the real frame about a time labeled "$t_3$" and to transition to state S2 shortly thereafter.

A receiver as described herein includes various signal processing elements each of which may be implemented with hardware, software executing on a data processor, or some combination of the two. In one embodiment, a first signal processor provides a first signal in response to detecting a first attribute of a received signal, such as the absence of phase clicks or the preamble pattern itself, when enabled. A second signal processor provides a second signal in response to detecting a second attribute of the received signal, such as a jump in signal strength, when enabled. A third signal processor provides a third signal in response to detecting a third attribute of the received signal, such as a SYNC word, and provides packet data when enabled. A controller enables the first signal processor in response to a receive enable signal, the second and third signal processors in response to the first signal, and disables the third signal processor in response to the second signal.

In a specific embodiment of a receiver that is useful for the M-Bus standard, the first signal processor is a signal arrival detector, the second signal processor is a SYNC word detector, and the third signal processor is a packet payload handler. By detecting a sudden jump in receive signal strength after detecting a preamble and while waiting for the SYNC word, the digital processor returns to state in which it resumes looking for the preamble, and does so quickly enough to detect a real preamble and avoid missing the frame.

The above-disclosed subject matter is to be considered illustrative, and not restrictive, and the appended claims are intended to cover all such modifications, enhancements, and other embodiments that fall within the true scope of the claims. For example, the state machine of FIG. 5 could be implemented by a sequence of program steps, or any hardware function that is capable of holding in a current state in response to an event or a condition, and is also capable of transitioning to one of a finite number of other states when triggered by an event or a condition.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver comprising:
   a first signal processor for providing a first signal in response to detecting a first attribute of a received signal, wherein said first signal processor comprises a signal arrival detector that provides said first signal in response to detecting a preamble in a frame, wherein said signal arrival detector detects said preamble in said frame by detecting an absence of phase clicks in said received signal;
   a second signal processor for providing a second signal in response to detecting a second attribute of said received signal, wherein said second signal processor comprises a jump detector that provides said second signal in response to detecting a jump in signal strength of said received signal over a predetermined period of time being greater than a threshold;
   a third signal processor for providing a third signal in response to detecting a third attribute of said received signal and providing packet data; and
   a controller for enabling said first signal processor in response to a receive enable signal, for controlling said third signal processor to provide said packet data in response to receiving said first signal and said third signal, and for initializing said first signal processor and said third signal processor in response to receiving said first signal and said second signal.

2. The receiver of claim 1 wherein said first signal processor comprises a preamble detector having an input for receiving a demodulated received signal, and an output coupled to said controller for providing said first signal, said first signal processor detecting said first attribute in response to detecting a preamble pattern in said demodulated received signal.

3. The receiver of claim 1 wherein said jump detector comprises:
   a received signal strength indicator having an input for receiving said received signal, and an output for providing a received signal strength;
   a differentiator having an input coupled to said output of said received signal strength indicator, and an output for providing a signal representative of a rate of change of said received signal strength; and
   a comparator having a first input coupled to said output of said differentiator, a second input for receiving said threshold, and an output for providing said second signal.

4. The receiver of claim 1 wherein said third signal processor is a frame processor comprising:
   a demodulator having an input for receiving said received signal, and an output;
   a synchronization word detector having an input coupled to said output of said demodulator, and an output; and
   a packet payload handler having an input coupled to said output of said synchronization word detector, a control input coupled to said controller, and an output for providing said packet data.

5. The receiver of claim 1 wherein said controller comprises:
   a state machine responsive to said first, second, and third signals and having a plurality of states, for controlling transitions among said plurality of states in response to said first, second, and third signals.

6. The receiver of claim 1 wherein said controller further initializes said third signal processor in response to said third signal processor failing to detect said third attribute within a predetermined period of time.

7. The receiver of claim 5 wherein said plurality of states comprises:
   a first state during which said controller controls said first signal processor to search for said first signal;
   a second state during which said controller controls said second signal processor to search for said second attribute and said third signal processor to search for said third attribute; and
   a third state during which said controller controls said third signal processor to receive a frame,
   wherein said state machine transitions from said first state to said second state in response to said first signal; and
   wherein said state machine transitions from said second state back to said first state in response to said second signal.

8. The receiver of claim 7 wherein said state machine further transitions from said second state back to said first state in response to one of said second signal and a synchronization search timeout.

9. A receiver comprising:
   a signal arrival detector for providing an arrival signal in response to detecting a preamble in a received signal;
   a jump detector for providing a jump signal in response to detecting a jump in signal strength of said received signal over a period of time above a threshold; and
   a frame processor for demodulating said received signal and providing a sync detected signal in response to detecting a synchronization word in said received signal and packet data; and
   a controller coupled to said signal arrival detector, said jump detector, and said frame processor, for enabling said signal arrival detector in response to a receive enable signal, for controlling said frame processor to search for said synchronization word in response to said arrival signal, and for controlling said frame processor to receive a frame in response to said detecting said synchronization word, said controller further terminating said searching for said synchronization word and re-enabling said signal arrival detector in response to said jump signal.

10. The receiver of claim 9 wherein said jump detector comprises:
   a received signal strength indicator having an input for receiving said received signal, and an output for providing a received signal strength;
   a differentiator having an input coupled to said output of said received signal strength indicator, and an output for providing a signal representative of a rate of change of said received signal strength; and
   a comparator having a first input coupled to said output of said differentiator, a second input for receiving said threshold, and an output for providing said jump signal.

11. The receiver of claim 9 wherein said frame processor comprises:
   a demodulator having an input for receiving said received signal, and an output;
   a synchronization word detector having an input coupled to said output of said demodulator, and an output; and
   a packet payload handler having an input coupled to said output of said synchronization word detector, a control input coupled to said controller, and an output for providing said packet data.

12. The receiver of claim 9 wherein said controller comprises:
   a state machine responsive to said arrival signal and said jump signal and having a plurality of states, for controlling transitions among said plurality of states in response to said arrival signal and said jump signal.

13. The receiver of claim 12 wherein said plurality of states comprises:
   a first state during which said controller controls the receiver to search for said arrival signal;
   a second state during which said controller controls the receiver to search for said synchronization word; and
   a third state during which said controller controls the receiver to receive said frame,
   wherein said state machine transitions from said first state to said second state in response to said arrival signal; and
   wherein said state machine transitions from said second state back to said first state in response to said jump signal.

14. The receiver of claim 13 wherein said state machine further transitions from said second state back to said first state in response to one of said jump signal and a synchronization search timeout.

15. A method comprising:
   searching for a preamble in a received signal;
   detecting an arrival of said preamble;
   searching for a synchronization word in said received signal in response to detecting said arrival of said preamble;
   stopping said searching for said synchronization word and repeating said searching for said preamble in said received signal in response to detecting a jump in signal strength of said received signal over a period of time above a threshold; and
   receiving a remainder of a frame in response to failing to detect said jump in said signal strength over said period of time above said threshold.

16. The method of claim 15, further comprising:
   repeating said searching for said preamble in said received signal further in response to failing to detect said synchronization word within a predetermined period of time.

17. The method of claim 15, wherein:
   said searching for said preamble comprises searching for an attribute of said received signal.

* * * * *